(12) United States Patent
Tukmanov

(10) Patent No.: US 12,192,796 B2
(45) Date of Patent: Jan. 7, 2025

(54) WIRELESS TELECOMMUNICATIONS NETWORK

(71) Applicant: BRITISH TELECOMMUNICATIONS PUBLIC LIMITED COMPANY, London (GB)

(72) Inventor: Anvar Tukmanov, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 0 days.

(21) Appl. No.: 18/694,895

(22) PCT Filed: Aug. 11, 2022

(86) PCT No.: PCT/EP2022/072520
§ 371 (c)(1),
(2) Date: Mar. 22, 2024

(87) PCT Pub. No.: WO2023/046360
PCT Pub. Date: Mar. 30, 2023

(65) Prior Publication Data
US 2024/0267763 A1      Aug. 8, 2024

(30) Foreign Application Priority Data

Sep. 24, 2021   (GB) ...................................... 2113680

(51) Int. Cl.
*H04W 24/02*      (2009.01)
*H04B 17/318*     (2015.01)
(Continued)

(52) U.S. Cl.
CPC .......... *H04W 24/02* (2013.01); *H04B 17/328* (2023.05); *H04L 1/0003* (2013.01); *H04W 8/22* (2013.01)

(58) Field of Classification Search
CPC ..... H04W 24/02; H04B 17/328; H04L 1/0003
See application file for complete search history.

(56) References Cited

U.S. PATENT DOCUMENTS

2010/0054141 A1* 3/2010 Youn ................ H04H 60/80
                                                                  370/312
2011/0051709 A1   3/2011 Roberts
(Continued)

FOREIGN PATENT DOCUMENTS

CN   104507112 A    4/2015
EP     2541984 A1   1/2013
(Continued)

OTHER PUBLICATIONS

International Search Report and Written Opinion received for PCT Patent Application No. PCT/EP2022/072520, mailed on Dec. 6, 2022, 14 pages.
(Continued)

*Primary Examiner* — Jamal Javaid
*Assistant Examiner* — Ryan C Kavleski
(74) *Attorney, Agent, or Firm* — PRANGER LAW PC

(57) ABSTRACT

This disclosure provides a method of configuring a wireless telecommunications network, the wireless telecommunications network including a first wireless transmitter. The method can include obtaining data indicating an amount of data transmitted by the first wireless transmitter in each Modulation and Coding Scheme (MCS) of a plurality of MCS; estimating a received signal strength change for the first wireless transmitter when using a first candidate configuration; estimating a first spectral efficiency for the first candidate configuration based on the amount of data transmitted by the first wireless transmitter in each MCS of the plurality of MCS and the received signal strength change for the first wireless transmitter when using the first candidate configuration; comparing the estimated first spectral effi-
(Continued)

ciency for the first candidate configuration to a reference spectral efficiency; and causing a reconfiguration of the wireless telecommunications network based on the comparison.

13 Claims, 6 Drawing Sheets

(51) Int. Cl.
*H04L 1/00* (2006.01)
*H04W 8/22* (2009.01)

(56) References Cited

U.S. PATENT DOCUMENTS

| | | | | |
|---|---|---|---|---|
| 2014/0310371 | A1* | 10/2014 | Panchal | H04L 63/108 709/213 |
| 2017/0111919 | A1 | 4/2017 | Madan et al. | |
| 2021/0013990 | A1 | 1/2021 | Chen et al. | |
| 2021/0359800 | A1* | 11/2021 | Levitsky | H04L 5/0007 |

FOREIGN PATENT DOCUMENTS

| | | |
|---|---|---|
| FI | 20195106 A1 | 8/2020 |
| WO | 2014163430 A1 | 10/2014 |
| WO | 2014182382 A1 | 11/2014 |
| WO | WO-2022002130 A1 * | 1/2022 |
| WO | WO-2023030443 A1 * | 3/2023 |

OTHER PUBLICATIONS

Office Action received for Great Britain Patent Application No. 2113680.9, mailed on Feb. 18, 2022, 8 pages.
Monikandan, et al., "A Review of MAC Scheduling Algorithms in LTE System", International Journal on Advanced Science Engineering and Information Technology, vol. 7, No. 3, Jun. 2017, pp. 1056-1068.
Ghosh, et al., "Uplink transmission and system performance", Chapter-4, Essentials of LTE and LTE-A, 2011, pp. 97-98.
Kawser, et al., "Downlink SNR to CQI Mapping for Different Multiple Antenna Techniques in LTE", International Journal of Information and Electronics Engineering, vol. 2, No. 5, Sep. 2012, pp. 757-760.
Wang, et al., "Impact of Multiuser Diversity and Channel Variability on Adaptive OFDM", IEEE 58th Vehicular Technology Conference, 2003, 5 pages.

* cited by examiner

WIRELESS TELECOMMUNICATIONS NETWORK

PRIORITY CLAIM

The present application is a National Phase entry of PCT Application No. PCT/EP2022/072520, filed Aug. 11, 2022, which claims priority from GB Application No. 2113680.9 filed Sep. 24, 2021, each of which hereby fully incorporated herein by reference.

TECHNICAL FIELD

The present disclosure relates to a method of configuring a wireless telecommunications network.

BACKGROUND

A wireless telecommunications network may experience an increase in user traffic over time such that there is a need to increase capacity of the wireless telecommunications network. This problem is particularly relevant to wide area wireless telecommunications networks, such as cellular telecommunications networks. A wireless telecommunications network may increase its capacity by increasing the amount of Radio Frequency (RF) spectrum, adding additional transceivers (such as base stations in a cellular telecommunications network) to a geographical area, and/or by increasing efficiency of existing transceivers.

An increase in efficiency of an existing transceiver in the wireless telecommunications network may be realized by upgrading the existing transceiver to use more advanced antenna technology and/or more advanced signal processing capabilities. A problem exists for wireless telecommunications network operators in deciding which transceiver(s) in its network should be upgraded, and what that upgrade should be (from a plurality of potential upgrades). That is, there may be a lower overall increase in the capacity of the network by upgrading one transceiver instead of another transceiver with a particular technology upgrade. This may be due to the transceiver being less able to discriminate between users in the spatial domain due to users being positioned towards the edge of the transceiver's coverage area, or because of insufficient scattering of radio channels, to allow the transceiver to realize the benefit of an upgraded antenna.

To address this problem, the operator may determine the efficiency of a transceiver. This efficiency may be expressed as a spectral efficiency, indicating the amount of data that may be transmitted by the transceiver for a given amount of spectral bandwidth. The determined spectral efficiency of a transceiver may be used by the operator to decide whether that transceiver should be upgraded (as a comparison against the spectral efficiency of another transceiver) and what technology that transceiver should be upgraded with. The operator may determine the spectral efficiency of a transceiver based on the amount of transmitted bits relative to the amount of spectral resources utilized to transmit those bits. Spectral efficiency may need to be estimated if this data is not available, the transceiver is not deployed, or the transceiver is not deployed in the configuration being assessed. Spectral efficiency estimation can be calculated based on the Signal to Noise Ratio (SNR) or a related metric. The SNR may be estimated based on Channel Quality Indicator (CQI) reports from users of the transceiver and/or by using reference signal strengths. However, these existing methods are unreliable and lead to a large uncertainty in the estimated spectral efficiency of the transceiver.

SUMMARY

According to a first aspect of the disclosure, there is provided a method of configuring a wireless telecommunications network, the wireless telecommunications network including a first wireless transmitter, the method comprising obtaining data indicating an amount of data transmitted by the first wireless transmitter in each Modulation and Coding Scheme (MCS) of a plurality of MCS; estimating a received signal strength change for the first wireless transmitter when using a first candidate configuration; estimating a first spectral efficiency for the first candidate configuration based on the amount of data transmitted by the first wireless transmitter in each MCS of the plurality of MCS and the received signal strength change for the first wireless transmitter when using the first candidate configuration; comparing the estimated first spectral efficiency for the first candidate configuration to a reference spectral efficiency; and causing a reconfiguration of the wireless telecommunications network based on the comparison.

The method may further comprise estimating a received signal strength change for the first wireless transmitter when using a second candidate configuration; estimating a second spectral efficiency for the second candidate configuration based on the amount of data transmitted by the first wireless transmitter in each MCS of the plurality of MCS and the received signal strength change for the first wireless transmitter when using the second candidate configuration, wherein the reference spectral efficiency is the estimated second spectral efficiency for the second candidate configuration and the step of causing a reconfiguration of the wireless telecommunications network is to reconfigure the first wireless transmitter to use either the first candidate configuration or the second candidate configuration based on the comparison.

The wireless telecommunications network may also include a second wireless transmitter, and the method may further comprise the steps of: obtaining data indicating an amount of data transmitted by the second wireless transmitter in each MCS of the plurality of MCS; estimating a received signal strength change for the second wireless transmitter when using a second candidate configuration; estimating a second spectral efficiency for the second candidate configuration based on the amount of data transmitted by the second wireless transmitter in each MCS of the plurality of MCS and the received signal strength change for the second wireless transmitter when using the second candidate configuration, wherein the reference spectral efficiency is the estimated second spectral efficiency for the second candidate configuration and the step of causing a reconfiguration of the wireless telecommunications network is to reconfigure the first wireless transmitter to use the first candidate configuration or the second wireless transmitter to use the second candidate configuration based on the comparison.

Estimating the received signal strength change may be based on one of more of a group comprising: a gain due to increased directivity, and a loss due to imperfect beamforming.

The first candidate configuration may be one or more of a group comprising: an antenna count, a compute capability, and an antenna technology. The second candidate configuration may be one or more of a group comprising: an antenna count, a compute capability, and an antenna technology.

The method may further comprise estimating a current spectral efficiency based on the amount of data transmitted by the first wireless transmitter in each MCS of the plurality of MCS, wherein the reference spectral efficiency is the current spectral efficiency.

The method may further comprise estimating a current spectral efficiency based on the amount of data transmitted by the first wireless transmitter in each MCS of the plurality of MCS, wherein the reference spectral efficiency is the current spectral efficiency; comparing the estimated second spectral efficiency to the current spectral efficiency, wherein causing a reconfiguration of the wireless telecommunications network is based on the comparison of the first spectral efficiency to the current spectral efficiency and the comparison of the second spectral efficiency to the current spectral efficiency.

The method may further comprise estimating a current spectral efficiency for the first wireless transmitter based on the amount of data transmitted by the first wireless transmitter in each MCS of the plurality of MCS, wherein the reference spectral efficiency is the current spectral efficiency for the first wireless transmitter; estimating a current spectral efficiency for the second wireless transmitter based on the amount of data transmitted by the second wireless transmitter in each MCS of the plurality of MCS; comparing the estimated second spectral efficiency to the current spectral efficiency for the second wireless transmitter, wherein the step of causing a reconfiguration of the wireless telecommunications network is based on the comparison of the first spectral efficiency to the current spectral efficiency for the first wireless transmitter and the comparison of the second spectral efficiency to the current spectral efficiency for the second wireless transmitter.

The first spectral efficiency may be estimated as:

$$SE = \frac{\sum_{l=1}^{L} \text{Bits}_l}{\sum_{l=1}^{L} PRB_l}$$

where:

$$\text{Bits}_l = \sum_{m=0}^{28} PRB_{l,m} \times E_{l,m} + B_l;$$

$$PRB_l = C_l \sum_{m=0}^{31} PRB_{l,m}$$

in which l is a distinct spatial path used for communication by the first wireless transmitter, $PRB_{l,m}$ is the number of PRBs using MCS index m and communicated using spatial path l, $E_{l,m}$ is the spectral efficiency of a PRB communicated using spatial path l and MCS m, $B_l$ represents the number of bits used for retransmitting previously transmitted data, and $C_l$ represents the level of multiplexing of physical resources.

According to a second aspect of the disclosure, there is provided a computer program comprising instructions which, when the program is executed by a computer, cause the computer to carry out the first aspect of the disclosure. The computer program may be stored on a computer readable carrier medium.

According to a third aspect of the disclosure, there is provided a data processing apparatus comprising a processor configured to perform the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
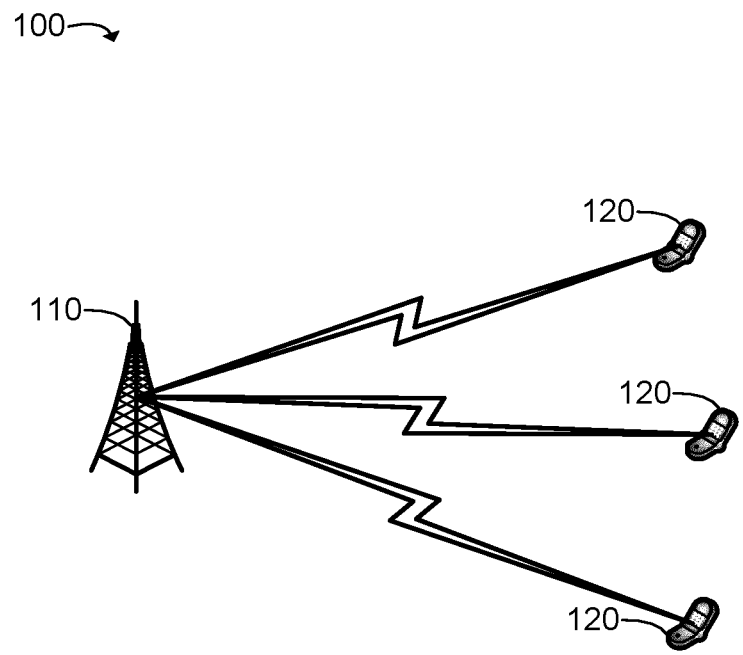
FIG. 1 is a schematic diagram of a wireless telecommunications network of a first embodiment of the present disclosure.

A first embodiment of a wireless telecommunications network will now be described with reference to FIGS. 1 and 2. In this embodiment, the wireless telecommunications network is a cellular telecommunications network 100 having a base station 110 and a plurality of User Equipment (UE) 120. The base station 110 and each UE of the plurality of UE 120 may communicate using a cellular telecommunications protocol, such as the 4th Generation (4G) or $5^{th}$ Generation (5G) protocols as standardized by the $3^{rd}$ Generation Partnership Project (3GPP). In these communications between the base station 110 and a UE of the plurality of UE 120, data is transmitted using a Modulation and Coding Scheme (MCS), defining the modulation technique and code rate to be used to communicate that data. The modulation technique defines how many bits can be carried by a single resource element, and the code rate is defined as the ratio between useful bits and the total transmitted bits (being the sum of the useful bits and the redundant bits). There are 32 different MCSs, each being designated by a particular MCS index, $I_{MCS}$, in the set of integers 0 to 31. Spectral efficiency increases with increasing MCS index. This is due to the higher indexed MCSs using modulation techniques that carry more bits per resource element and/or a code rate that has a higher ratio of useful bits to total transmitted bits. An MCS selection algorithm may therefore select higher-indexed MCSs when high data rates are a priority. However, MCSs having a lower index are more robust such that MCS selection algorithms may select lower-indexed MCSs to reduce error rate (for example, where signal quality is poor or the communications favor reliability over data rate).

Figure 2:
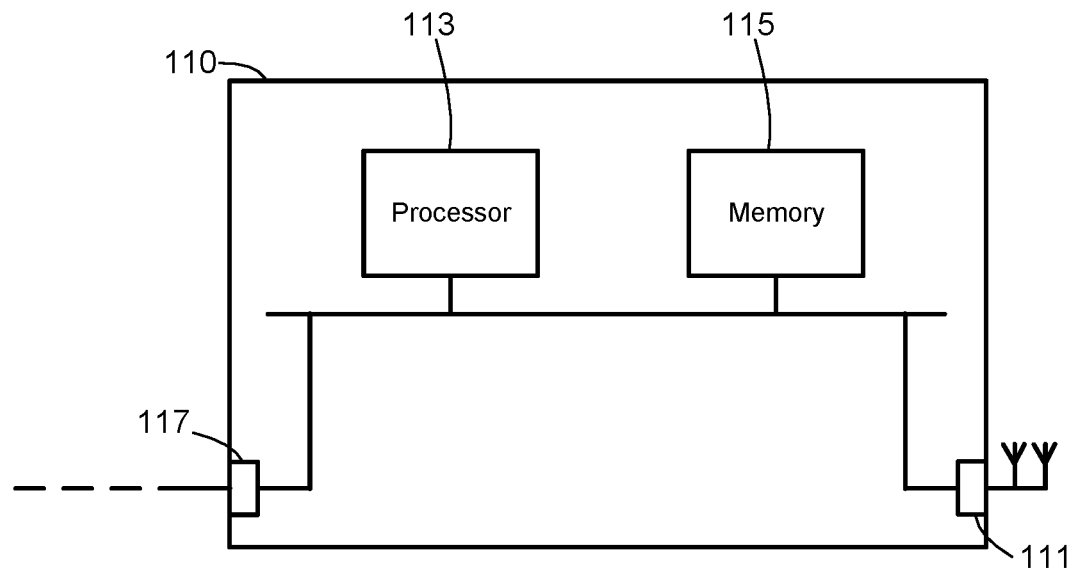
FIG. 2 is a schematic diagram of a base station of the network of FIG. 1.
Figure 3:
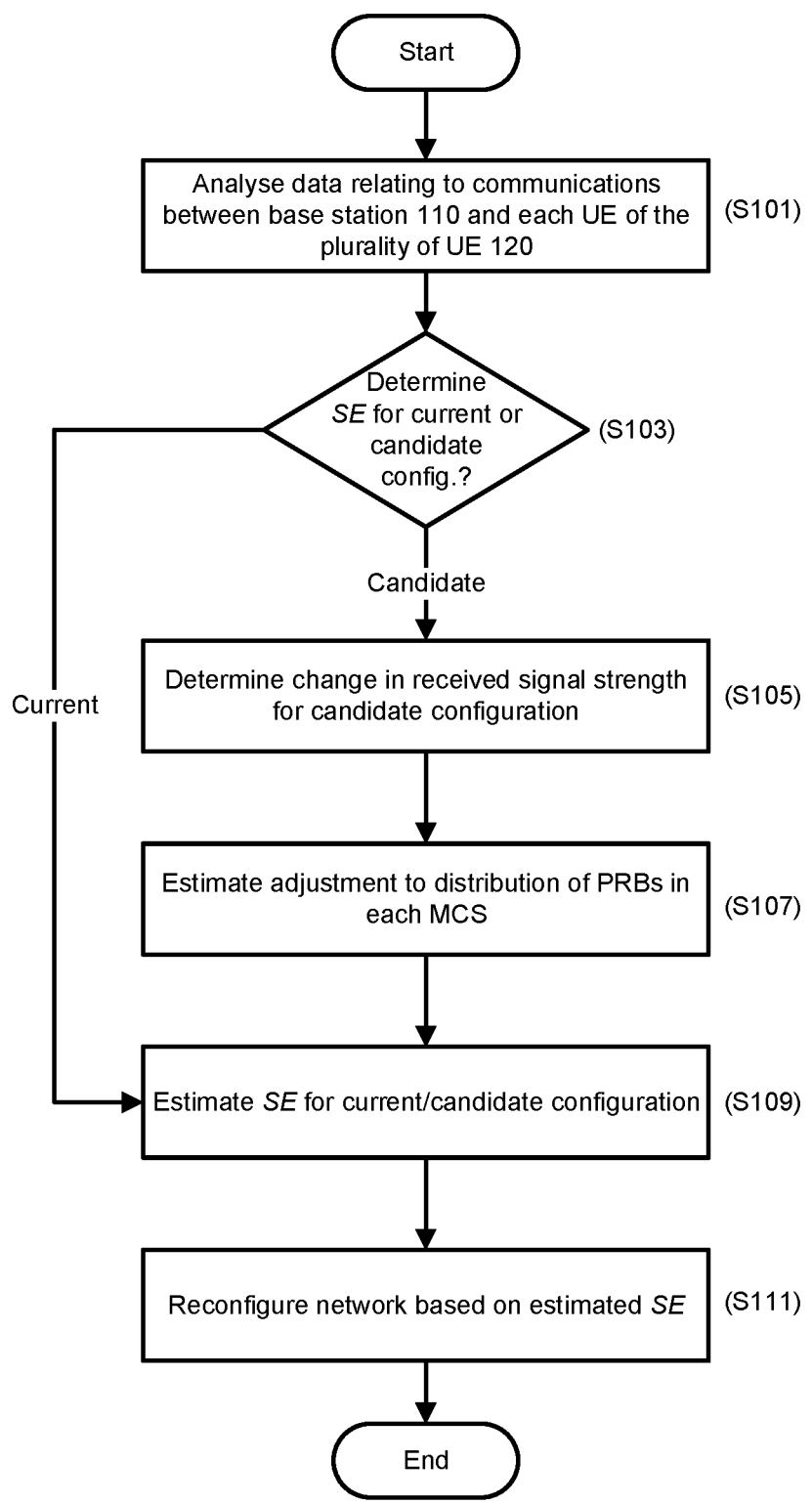
FIG. 3 is a flow diagram illustrating a method of the first embodiment of the present disclosure.

The base station 110 is shown in more detail in FIG. 2. The base station 110 includes a first communications interface 111, a processor 113, memory 115 and a second communications interface 117. The first communications interface 111 is connected to an antenna system for communication with a UE of the plurality of UE 120, and the second communications interface 117 is a backhaul connection to a core network (not shown). In this embodiment, the antenna system includes 2 transceivers. The processor 113 and memory 115 cooperate to perform embodiments of the method of the present disclosure, discussed below.

Figure 4A:
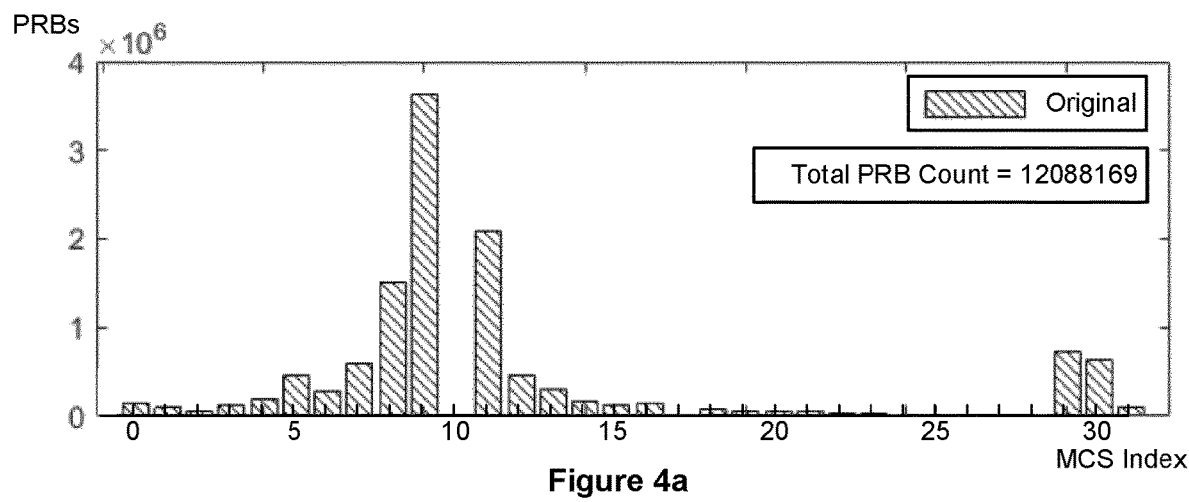
FIGS. 4a, 4b, 5a and 5c are histograms illustrating a distribution of Modulation and Coding Scheme (MCS) indices for a plurality of Physical Resource Blocks (PRBs) transmitted in the network of FIG. 1.

A first embodiment of a method of the present disclosure will now be described with reference to FIGS. 3 to 6. In S101, the base station's processor 113 analyses data (stored in memory 115) relating to communications from the base station 110 to each UE of the plurality of UE 120 for a time period. The time period may for example be between one hour and one day, or may be for a number of days. In this analysis, the processor 113 records the MCS used by each Physical Resource Block (PRB) communicated during the time period. The MCS used by each PRB is determined using, for example, a technique described in "A Review of MAC Scheduling Algorithms in LTE System", Satheesh Monikandan et al., International Journal on Advanced Science Engineering Information Technology, Vol. 7 (2017) No. 3. An example histogram illustrating a distribution of PRBs in each MCS is shown in FIG. 4a.

In S103, it is determined whether the spectral efficiency to be calculated is for the current configuration or a candidate configuration. If the spectral efficiency of the current configuration is being determined, then the process skips to S109. In this embodiment, the spectral efficiency of the base station 110 using a candidate configuration is being determined and so the process continues to S105.

In S105, the processor 113 determines a change in received signal strength (that is, of signals transmitted by the base station 110 and received at each UE of the plurality of UE 120) for the candidate configuration relative to the current configuration. This may be based on one or more factors that increase the received signal strength and/or on one or more factors that decrease the received signal strength. In this example, the change in received signal strength is based on a first factor ("F1") relating to an increase in received signal strength due to improved directivity for a candidate configuration in which the count of antennas for the base station 110 is increased from No (equal to 2 in this example) to $N_1$ (e.g. 4, 8, 16, 32, or 64). This first factor may be determined as:

$$10\log_{10}\frac{N_1}{N_0} \quad (1)$$

In this example, the change in received signal strength is also based on a second factor ("F2") relating to a decrease in received signal strength due to imperfect beamforming for the candidate configuration in which the count of antennas for the base station 110 is increased from $N_0$ to $N_1$. This second factor may be determined as:

$$-\sqrt{\left(10\log_{10}\frac{N_1}{N_0}\right)} \quad (2)$$

Table 1, below, illustrates the change in received signal strength for a plurality of candidate configurations:

TABLE 1

| | Change in received signal strength for a plurality of candidate configurations | | | | |
|---|---|---|---|---|---|
| | Number of antennas in candidate configuration | | | | |
| | 4 | 8 | 16 | 32 | 64 |
| Change due to factor F1 (dB) | 3.0 | 6.0 | 9.0 | 12.0 | 15.1 |
| Change due to factor F2 (dB) | −1.74 | −2.45 | −3.01 | −3.47 | −3.87 |
| Total Change (dB) | 1.28 | 3.57 | 6.02 | 8.57 | 11.17 |

Figure 4B:
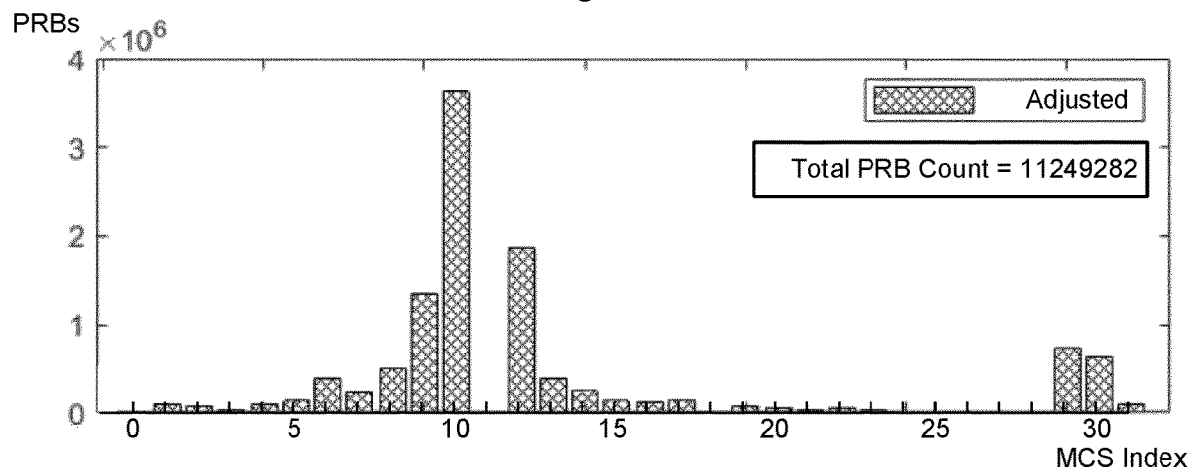
Figure 5A:
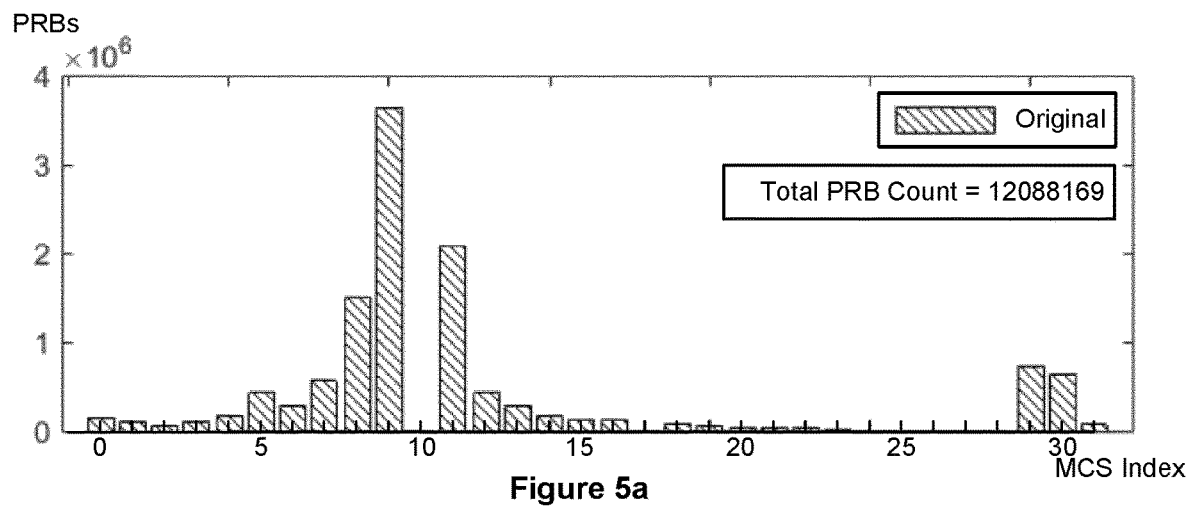
Figure 5B:
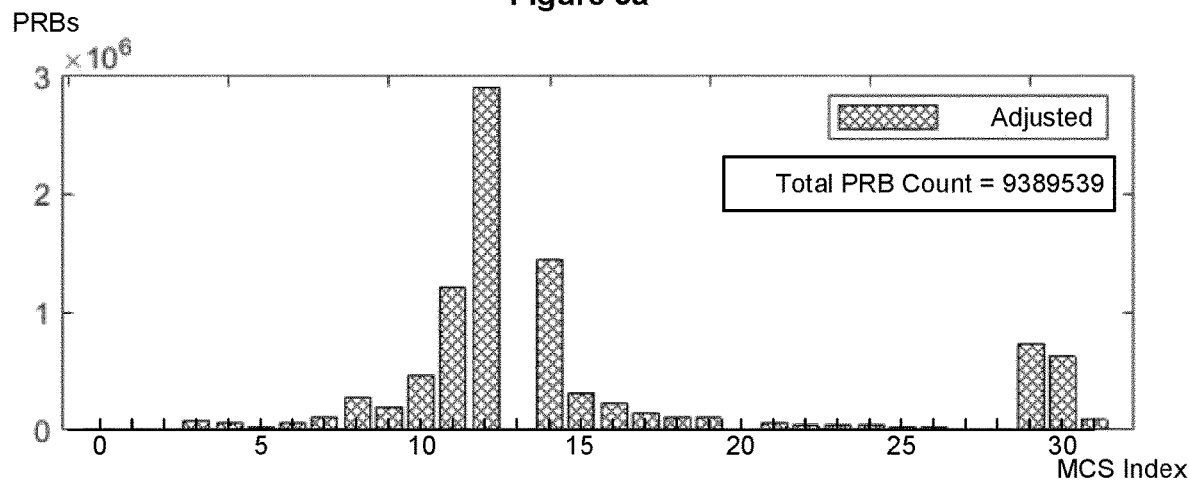

In S107, the processor 113 estimates an adjustment to the distribution of PRBs in each MCS recorded in S101 for the candidate configuration based on the change in received signal strength determined in S105 for the candidate configuration. In this example, the processor 113 makes an adjustment such that the data carried by PRBs using MCS index x is instead carried by PRBs using MCS index x+y, where y is the integer-truncated value of the change in received signal strength for the candidate configuration. For example, if the candidate configuration is 4 antennas such that the integer-truncated value of the change in received signal strength is 1, then the data carried by the PRBs using MCS index 0 is adjusted such that it is carried by PRBs using MCS index 1, the data carried by PRBs using MCS index 1 is adjusted such that it is carried by PRBs using MCS index 2, and so on, until the data carried by PRBs using MCS index 27 is adjusted such that it is carried by PRBs using MCS index 28. No adjustment is made to the data carried by MCS index 28, as there are no MCSs having a greater index (and therefore more spectrally efficient) that may carry that data instead (as MCS indices 29 to 31 carry retransmissions). In another example in which the candidate configuration is 8 antennas such that the integer-truncated value of the change in received signal strength is 3, then the data carried by PRBs using MCS index 0 is adjusted such that it is carried by PRBs using MCS index 3, the data carried by PRBs using MCS index 1 is adjusted such that it is carried by PRBs using MCS index 4, and so on, until the data carried by MCS index 25 is adjusted such that it is carried by PRBs using MCS index 28. Again, no adjustment is made to the data being carried by MCS index 28, but the data carried by MCS indices 26 to 27 may be carried by MCS indices 27 to 28. FIG. 4a illustrates the distributions of PRBs in each MCS for the original data (in which the base station uses 2 antennas) and FIG. 4b illustrates the distribution of PRBs in each MCS for the adjusted data (in which the base station uses the candidate configuration of 4 antennas). FIG. 5a also illustrates the distributions of PRBs in each MCS for the original data (in which the base station uses 2 antennas) and FIG. 5b illustrates the distribution of PRBs in each MCS for the adjusted data (in which the base station uses the candidate configuration of 8 antennas). These figures illustrate that fewer PRBs are required to carry the same amount of data when using the candidate configurations as the higher indexed MCSs have greater spectral efficiency.

In S109, the processor 113 estimates the spectral efficiency of the base station 110 for a particular configuration. In an example in which the processor 113 estimates the spectral efficiency of the current configuration, the following calculations are based on the data collected in S101. In an example in which the processor 113 estimates the spectral efficiency of a candidate configuration, the following calculations are based on the data collected in S101 as adjusted in S107 for that candidate configuration.

The spectral efficiency of a particular configuration, SE, is estimated as:

$$SE = \frac{\sum_{l=1}^{L} \text{Bits}_l}{\sum_{l=1}^{L} PRB_l} \quad (3)$$

In which:

l represents a distinct layer used by the base station 110 to communicate with a UE of the plurality of UE 120. In this context, a layer is a spatial path that may be used for communication between a transmitter and a receiver using the same spectral resources. The term "layer" may also be referred to as "spatial path". In this example, there is a single layer (but more than one layer is possible in other implementations);

Bits$_l$ is the total number of bits transferred in layer l; and

PRB$_l$ is the total number of PRBs utilized to transmit Bits).

Bits$_l$ may be calculated as:

$$\text{Bits}_l = \sum_{m=0}^{28} PRB_{l,m} \times E_{l,m} + B_l; \quad (4)$$

In which:

PRB$_{l,m}$ is the number of PRBs using MCS index m and communicated using layer l. If estimating the spectral efficiency of the current configuration, then this count of PRBs in each MCS is based on the data collected in S101. If estimating the spectral efficiency of a candidate configuration, then the count of PRBs in each MCS is based on the data collected in S101 as adjusted in S107 for that candidate configuration. Note that MCS indices 29 to 31 are not included as they carry retransmissions;

E$_{l,m}$ is the spectral efficiency of PRBs transmitted using/layers and using MCS m and is calculated as:

$$E_{l,m} = N_l \times S_{l,m} \quad (5)$$

where N$_l$ is the number of application data-carrying resource elements in a PRB transmitted over each of the/layers, (for example, for 4G, this can be calculated as 14×12−N$_S$, where N$_S$ is the number of symbols occupied by overhead signalling), and S$_{l,m}$, specified in Table 2 below, is the spectral efficiency per symbol carried by each resource element; and B$_l$ is a term representing the number of bits used for retransmitting previously transmitted data (which may be determined by methods known to the skilled person).

The spectral efficiency per symbol, S$_{l,m}$, may be determined from Table 2 below. The spectral efficiency for MCS indices 29 to 31 can be determined based on the specific retransmission process, and example spectral efficiencies are used in Table 2.

TABLE 2

Example spectral efficiency for each MCS.

| MCS index | Spectral efficiency (bit/s/Hz) |
| --- | --- |
| 0 | 0.188 |
| 1 | 0.244 |
| 2 | 0.308 |
| 3 | 0.384 |
| 4 | 0.484 |
| 5 | 0.586 |
| 6 | 0.688 |
| 7 | 0.816 |
| 8 | 0.942 |
| 9 | 1.058 |
| 10 | 1.056 |
| 11 | 1.18 |
| 12 | 1.324 |
| 13 | 1.528 |
| 14 | 1.7 |
| 15 | 1.892 |
| 16 | 2.04 |
| 17 | 2.04 |
| 18 | 2.19 |
| 19 | 2.448 |
| 20 | 2.616 |
| 21 | 2.922 |
| 22 | 3.126 |
| 23 | 3.402 |
| 24 | 3.672 |
| 25 | 3.822 |
| 26 | 4.11 |
| 27 | 4.254 |
| 28 | 5.022 |
| 29 | 0.5698 |
| 30 | 1.531 |
| 31 | 3.302 |

Lastly, PRB$_l$ may be calculated as:

$$PRB_l = C_l \sum_{m=0}^{31} PRB_{l,m} \quad (6)$$

In which:

C$_l$ represents the level of multiplexing of physical resources, and can be assumed to be equal to 1/l.

Figure 6:
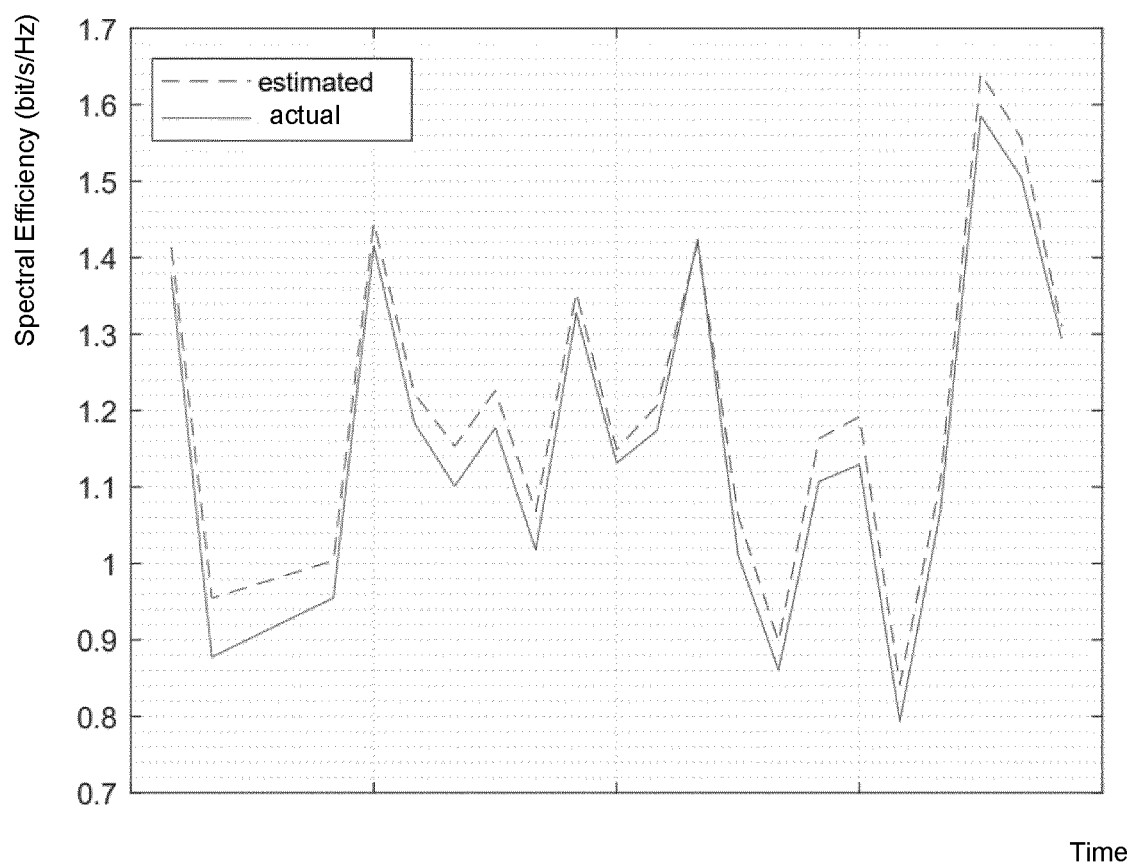
FIG. 6 is a graph illustrating the spectral efficiency as estimated using the method of FIG. 3.

FIG. 6 illustrates the estimated spectral efficiency, estimated using the above process, against the actual spectral efficiency based on a real-world scenario. It is shown that the estimated spectral efficiency correlates very closely with the actual spectral efficiency. FIG. 6 illustrates an example of the estimated spectral efficiency for a current configuration. A similar correlation to the actual spectral efficiency will be realized for the estimated spectral efficiency for a candidate configuration (subject to a suitable choice of factors affecting received signal strength, such as F1 and F2 above).

The spectral efficiency may then be used to reconfigure the wireless network 100 (S111). This reconfiguration may be based on identifying a candidate configuration from the plurality of candidate configurations that provides a suitable spectral efficiency increase (in which the spectral efficiency increase for a particular candidate configuration is the difference between the estimated spectral efficiency using the current configuration and the estimated spectral efficiency using that candidate configuration). The spectral efficiency increase for a candidate configuration may be balanced against the capital cost of upgrading the base station 110 to that candidate configuration and/or the operational cost of operating the base station 110 with that candidate configuration.

In another example, the spectral efficiency (or spectral efficiency increase) for a candidate configuration for the base station 110 may be compared to the spectral efficiency (or spectral efficiency increase) for the candidate configuration for another base station in the operator's network. The operator may then decide that the upgrade to a particular candidate configuration should be performed on the base station that provides the greatest overall spectral efficiency for the network.

The skilled person will understand that the factors resulting in the change in received signal strength are non-limiting, and alternative or additional factors may be included in this analysis.

Furthermore, the skilled person will understand the above method may be applied to other candidate configurations (i.e. that are not based on a change in the number of antennas in the base station's antenna system). For example, the candidate configuration may relate to the use of an alternative antenna technology or a change in the compute capability of the base station's processor 113. The received signal strength change may also be estimated based on a mixture of candidate configurations (e.g. a change in the number of antennas and a change in the compute capability).

In the above embodiments, the data carried by PRBs using MCS index x was adjusted such that it was carried by PRBs using MCS index x+y, in which y is the truncated value of the received signal strength change. The skilled person will understand that the function applied for the adjustment may differ. For example, in a scenario where the operator determines that a received signal strength change of 2 dB is required to increase the MCS index by 1, then the distribution may be adjusted based on that logic. Furthermore, the function may not be applied equally to all MCSs, such that the received signal strength change for each MCS (or a subset of MCSs) may be determined and the data adjusted accordingly. Still furthermore, in a more complicated adjustment, the data for one or more MCSs are not adjusted (such as the retransmission MCSs 29 to 31) and data may not be adjusted such that it is carried by PRBs using a particular MCS (in which case it may be carried by the next available MCS).

The skilled person will understand that it is also non-essential that the method of the present disclosure is carried out on the base station. The method may be performed on any form of data processing apparatus, which may be distributed.

In the above embodiment, the dataset used for analysis relates to downlink communications from the base station to each UE of the plurality of UE. However, the skilled person will understand that data relating to uplink communications may be used (in addition or in the alternative).

The skilled person will understand that any combination of features is possible within the scope of the disclosure, as claimed.

The invention claimed is:

1. A method of configuring a wireless telecommunications network, the method being performed by a data processing apparatus, the wireless telecommunications network including a first wireless transmitter, the method comprising:
    obtaining data indicating an amount of data transmitted by the first wireless transmitter in each Modulation and Coding Scheme (MCS) of a plurality of MCSs;
    estimating a change in received signal strength for the first wireless transmitter when using a first candidate configuration relative to a current configuration;
    estimating a first spectral efficiency for the first candidate configuration based on the amount of data transmitted by the first wireless transmitter in each MCS of the plurality of MCSs and the received signal strength change for the first wireless transmitter when using the first candidate configuration;
    comparing the estimated first spectral efficiency for the first candidate configuration to a reference spectral efficiency; and
    causing a reconfiguration of the wireless telecommunications network based on the comparing.

2. The method as claimed in claim 1, further comprising:
    estimating a change in received signal strength for the first wireless transmitter when using a second candidate configuration relative to the current configuration; and
    estimating a second spectral efficiency for the second candidate configuration based on the amount of data transmitted by the first wireless transmitter in each MCS of the plurality of MCSs and the received signal strength change for the first wireless transmitter when using the second candidate configuration,
    wherein the reference spectral efficiency is the estimated second spectral efficiency for the second candidate configuration and causing a reconfiguration of the wireless telecommunications network is to reconfigure the first wireless transmitter to use either the first candidate configuration or the second candidate configuration based on the comparing.

3. The method as claimed in claim 1, wherein the wireless telecommunications network also includes a second wireless transmitter, and the method further comprises:
    obtaining data indicating an amount of data transmitted by the second wireless transmitter in each MCS of the plurality of MCSs;
    estimating a change in received signal strength for the second wireless transmitter when using a second candidate configuration relative to the current configuration; and
    estimating a second spectral efficiency for the second candidate configuration based on the amount of data transmitted by the second wireless transmitter in each MCS of the plurality of MCSs and the received signal strength change for the second wireless transmitter when using the second candidate configuration,
    wherein the reference spectral efficiency is the estimated second spectral efficiency for the second candidate configuration and causing a reconfiguration of the wireless telecommunications network is to reconfigure the first wireless transmitter to use the first candidate configuration or the second wireless transmitter to use the second candidate configuration based on the comparison.

4. The method as claimed in claim 1, wherein estimating the change in received signal strength is based on one or more of a group comprising: a gain due to increased directivity, and a loss due to imperfect beamforming.

5. The method as claimed in claim 1, wherein the first candidate configuration is one or more of a group comprising: an antenna count, a compute capability, and an antenna technology.

6. The method as claimed in claim 2, wherein the second candidate configuration is one or more of a group comprising: an antenna count, a compute capability, and an antenna technology.

7. The method as claimed in claim 2, further comprising:
    estimating a current spectral efficiency based on the amount of data transmitted by the first wireless transmitter in each MCS of the plurality of MCSs, wherein the reference spectral efficiency is the current spectral efficiency.

8. The method as claimed in claim 2, further comprising:
estimating a current spectral efficiency based on the amount of data transmitted by the first wireless transmitter in each MCS of the plurality of MCSs, wherein the reference spectral efficiency is the current spectral efficiency; and
comparing the estimated second spectral efficiency to the current spectral efficiency, wherein causing a reconfiguration of the wireless telecommunications network is based on the comparison of the first spectral efficiency to the current spectral efficiency and the comparison of the second spectral efficiency to the current spectral efficiency.

9. The method as claimed in claim 3, further comprising:
estimating a current spectral efficiency for the first wireless transmitter based on the amount of data transmitted by the first wireless transmitter in each MCS of the plurality of MCSs, wherein the reference spectral efficiency is the current spectral efficiency for the first wireless transmitter;
estimating a current spectral efficiency for the second wireless transmitter based on the amount of data transmitted by the second wireless transmitter in each MCS of the plurality of MCSs; and
comparing the estimated second spectral efficiency to the current spectral efficiency for the second wireless transmitter,
wherein causing a reconfiguration of the wireless telecommunications network is based on the comparison of the first spectral efficiency to the current spectral efficiency for the first wireless transmitter and the comparison of the second spectral efficiency to the current spectral efficiency for the second wireless transmitter.

10. The method as claimed in claim 1, wherein the first spectral efficiency is estimated as:

$$SE = \frac{\sum_{l=1}^{L} \text{Bits}_l}{\sum_{l=1}^{L} PRB_l}$$

where:

$$\text{Bits}_l = \sum_{m=0}^{28} PRB_{l,m} \times E_{l,m} + B_l;$$

$$PRB_l = C_l \sum_{m=0}^{31} PRB_{l,m}$$

in which l is a distinct spatial path used for communication by the first wireless transmitter, L is a total number of distinct spatial paths used for communication by the first wireless transmitter, $PRB_{l,m}$ is the number of physical resource blocks (PRBs) using MCS index m and communicated using spatial path l, $E_{l,m}$ is the spectral efficiency of a PRB communicated using spatial path l and MCS m, Bi represents the number of bits used for retransmitting previously transmitted data, and $C_l$ represents the level of multiplexing of physical resources.

11. A computer system comprising at least one processor and memory configured to carry out the method of claim 1.

12. A non-transitory computer readable carrier medium comprising a computer program which, when executed by a computer, causes the computer to carry out the method of claim 1.

13. A data processing apparatus comprising a processor configured to perform the method of claim 1.

* * * * *